(12) United States Patent
Lakshmi Narayanan et al.

(10) Patent No.: US 10,650,531 B2
(45) Date of Patent: May 12, 2020

(54) LIDAR NOISE REMOVAL USING IMAGE PIXEL CLUSTERINGS

(71) Applicant: HONDA MOTOR CO., LTD., Tokyo (JP)

(72) Inventors: Athmanarayanan Lakshmi Narayanan, Sunnyvale, CA (US); Yi-Ting Chen, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 15/923,592

(22) Filed: Mar. 16, 2018

(65) Prior Publication Data

US 2019/0287254 A1 Sep. 19, 2019

(51) Int. Cl.
*G06T 7/187* (2017.01)
*G06T 5/00* (2006.01)

(52) U.S. Cl.
CPC .............. *G06T 7/187* (2017.01); *G06T 5/002* (2013.01); *G06T 2207/10004* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| | | |
|---|---|---|
| 8,913,784 B2 | 12/2014 | Collard et al. |
| 9,523,772 B2 | 12/2016 | Rogan et al. |
| 2015/0042806 A1 | 2/2015 | Wierich |
| 2016/0103208 A1 | 4/2016 | Heo et al. |
| 2017/0124781 A1 | 5/2017 | Douillard et al. |
| 2018/0027224 A1* | 1/2018 | Javidnia ............... G06K 9/4604 382/154 |
| 2018/0232947 A1* | 8/2018 | Nehmadi ................ G01S 17/89 |
| 2018/0322640 A1* | 11/2018 | Kim ...................... G01S 17/023 |
| 2019/0155973 A1* | 5/2019 | Morczinek ............ G06T 3/4038 |
| 2019/0333237 A1* | 10/2019 | Javidnia ..................... G06T 5/20 |

OTHER PUBLICATIONS

Leslar, M., et al., "A Comparison of Two New Methods of Outlier Detection for Mobile Terrestrial Lidar Data" Proc Int. Arch. Photogramm. Remote Sens. Spatial Inf. Sci, 38, pp. 78-84.

(Continued)

*Primary Examiner* — Fayyaz Alam
(74) *Attorney, Agent, or Firm* — Arent Fox, LLP

(57) ABSTRACT

A system, computer-readable medium, and method for improving semantic mapping and traffic participant detection for an autonomous vehicle are provided. The methods and systems may include obtain a two-dimensional image, obtain a three-dimensional point cloud comprising a plurality of points, perform semantic segmentation on the image to map objects with a discrete pixel color, and overlaying the semantic segmentation on the image to generate a updated image, generate superpixel clusters from the semantic segmentation to group like pixels together, project the point cloud onto the updated image comprising the superpixel clusters, and remove points determined to be noise/errors from the point cloud based on determining noisy points within each superpixel cluster.

20 Claims, 10 Drawing Sheets

(3 of 10 Drawing Sheet(s) Filed in Color)

(56) References Cited

OTHER PUBLICATIONS

Matkan, A. A., et al., "Spatial Analysis for Outlier Removal from Lidar Data", The International Archives of the Photogrammetry, Remote Sensing and Spatial Information Sciences, vol. XL-2/W3, 2014.

Serafin. J., et al., "Fast and Robust 3D Feature Extraction from Sparse Point Clouds". Intelligent Robots and Systems (IROS), IEEE/RSJ International Conference, pp. 4105-4112, 2016.

* cited by examiner

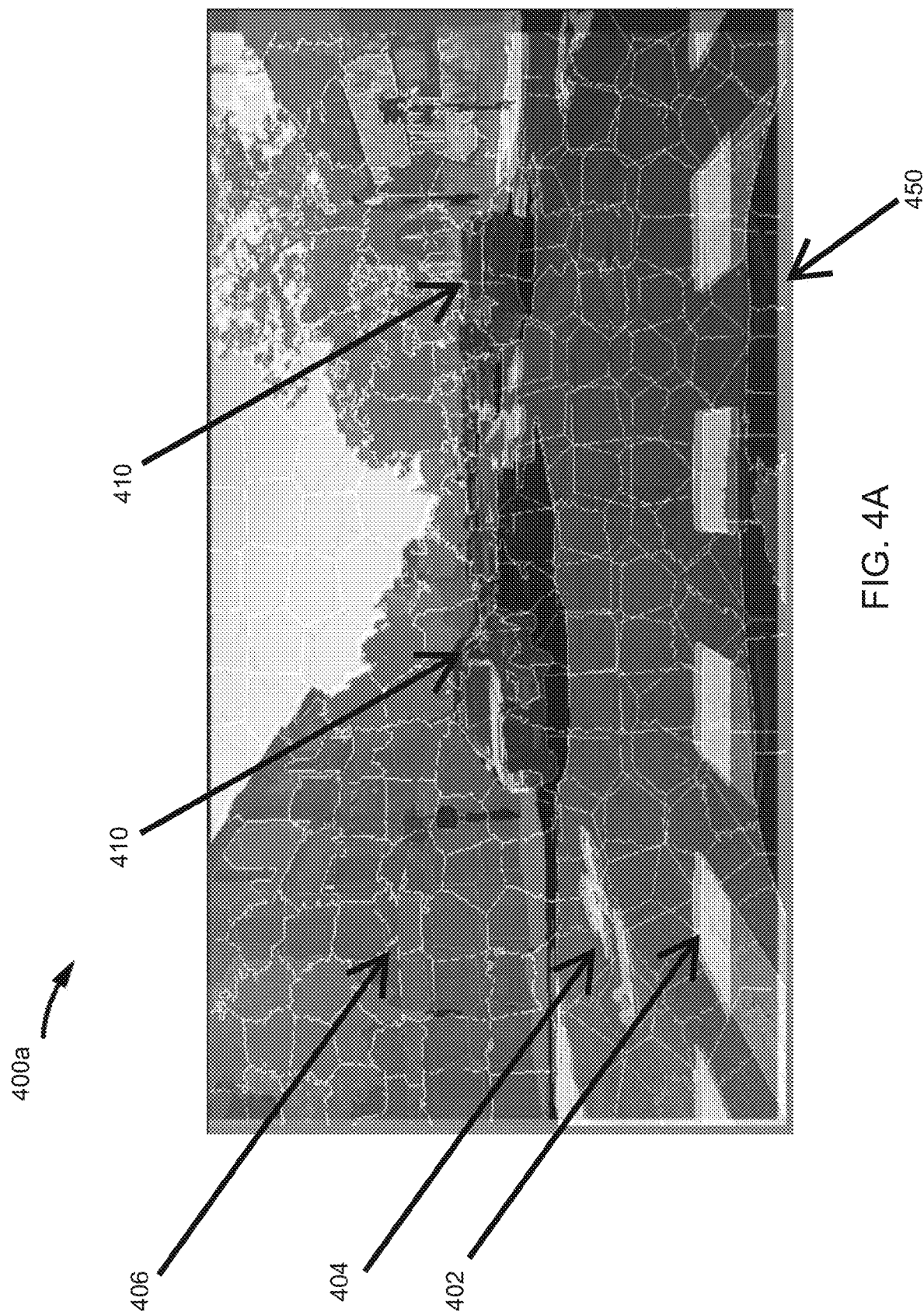

LIDAR NOISE REMOVAL USING IMAGE PIXEL CLUSTERINGS

TECHNICAL FIELD

The present disclosure relates generally to Light Detection and Ranging ("LIDAR") noise removal, and more particularly, using image pixel clustering to filter out noise/errors when performing semantic mapping and traffic participant detection.

BACKGROUND

The development of autonomous vehicles has progressed significantly due to the expansion in perception, motion planning and control, and/or emerging sensing technologies, among other factors. To achieve autonomous navigation, accurate localization and mapping may be needed. Autonomous vehicles may capture images and point clouds of an environment to assist in the localization and mapping. Autonomous vehicles perform Simultaneous Localization And Mapping ("SLAM") operations on the captured images and point clouds to build a map of the environment and obtain motion and trajectory/odometry data. SLAM operations may include one or more operations to extract, associate, estimate, and/or update localization and mapping. Further, autonomous vehicles also perform semantic mapping and scene understanding techniques. Frequently, additional points may be projected onto images during the semantic mapping and scene understanding due to a misalignment of LIDAR and camera placement, and/or due to sensor noise in the LIDAR. Inclusion of these additional points may be a problem for accurate semantic mapping and scene understanding for autonomous vehicles.

In view of the foregoing, there may be a need in the art for ways to more accurately perform semantic mapping by filtering out the additional points generated by the LIDAR based on noise/errors. Further advantages and novel features will become apparent from the disclosure provided below.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method is provided for semantic mapping and traffic participant detection for an autonomous vehicle. The method includes obtaining, via a camera, a two-dimensional image. In addition, the method includes obtaining, via a light detector, a three-dimensional point cloud having a plurality of points. In addition, the method includes performing semantic segmentation on the image to map objects with a discrete pixel color, and overlaying the semantic segmentation on the image to generate a semantic segmentation image. In addition, the method includes generating superpixel clusters from the semantic segmentation image to group like pixels together. In addition, the method includes projecting the point cloud onto the semantic segmentation image having the superpixel clusters. In addition, the method includes removing points determined to be noise/errors from the point cloud based on determining noisy points within each superpixel cluster.

In another example, a system is provided that includes a camera for obtaining a two-dimensional image, and a light detector for obtaining a three-dimensional point cloud having a plurality of points. In addition, the system includes a memory, and a processor coupled to the memory. In addition, the system performs semantic segmentation on the image to map objects with a discrete pixel color, and overlaying the semantic segmentation on the image to generate a semantic segmentation image. In addition the system performs generating superpixel clusters from the semantic segmentation image to group like pixels together. In addition, the system performs projecting the point cloud onto the semantic segmentation image having the superpixel clusters. In addition, the system performs removing points determined to be noise/errors from the point cloud based on determining noisy points within each superpixel cluster.

In further another example, a computer-readable medium storing computer executable code is provided for obtaining a two-dimensional image, and obtaining a three-dimensional point cloud having a plurality of points. In addition, the non-transitory computer-readable medium storing computer executable code is provided for performing semantic segmentation on the image to map objects with a discrete pixel color, and overlaying the semantic segmentation on the image to generate a semantic segmentation image. In addition, the non-transitory computer-readable medium storing computer executable code is provided for generating superpixel clusters from the semantic segmentation image to group like pixels together. In addition, the non-transitory computer-readable medium storing computer executable code is provided for projecting the point cloud onto the semantic segmentation image having the superpixel clusters. In addition, the non-transitory computer-readable medium storing computer executable code is provided for removing points determined to be noise/errors from the point cloud based on determining noisy points within each superpixel cluster.

To the accomplishment of the foregoing and related ends, the one or more aspects of the disclosure have the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The patent application file contains at least one drawing executed in color. Copies of this patent application publication with color drawing(s) will be provided by the Office upon request of payment of the necessary fee.

The novel features believed to be characteristics of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

FIG. 4A illustrates another example of a semantic segmentation predicted image created with superpixels according to one aspect of the disclosure;

DETAILED DESCRIPTION

Figure 1:
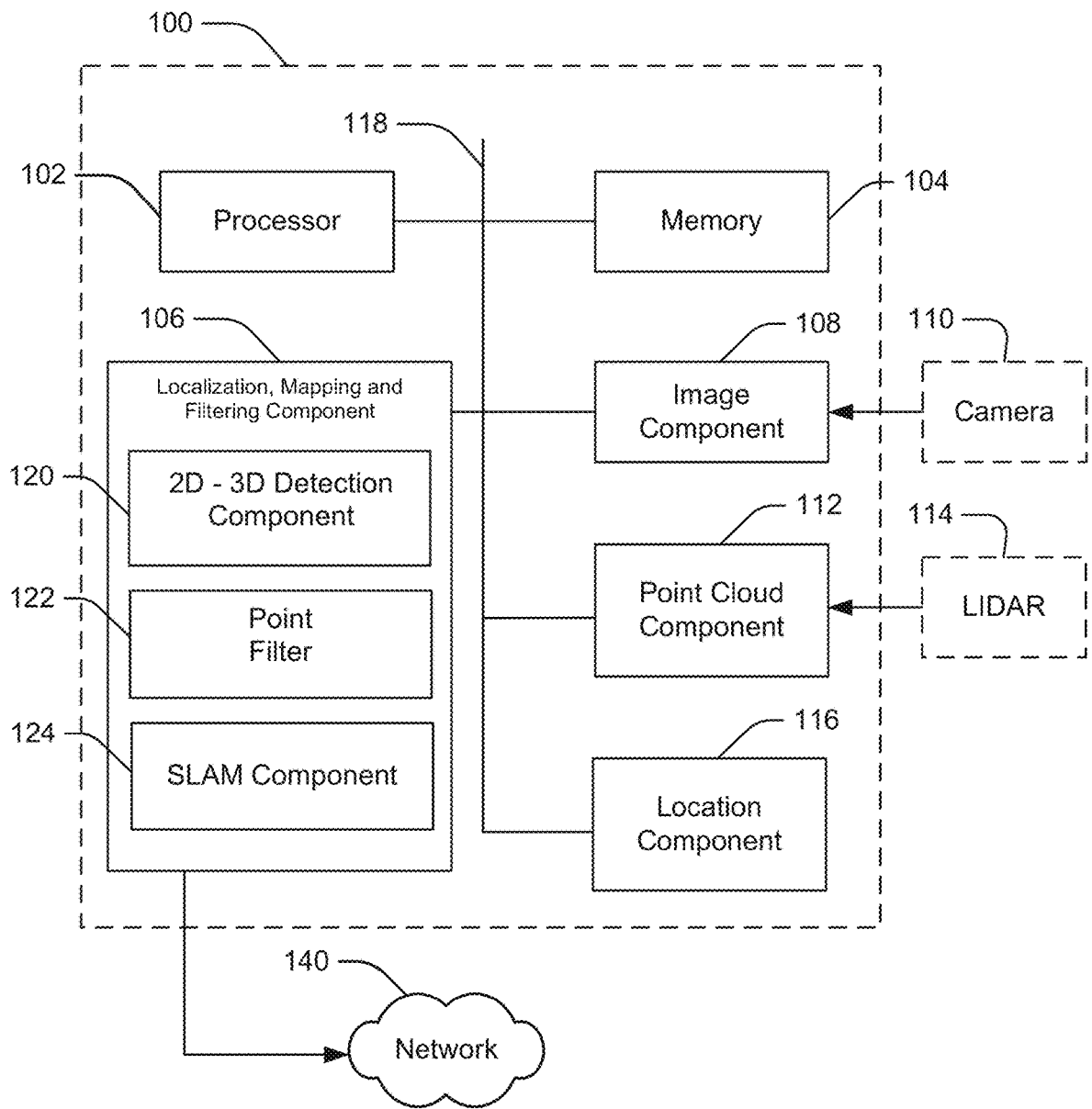
FIG. 1 illustrates a schematic view of an example of a system for localization, mapping and filtering in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Localization, mapping and filtering for an autonomous vehicle may be generated using input from a plurality of input sources, such as an image input (e.g., from a camera) and a light sensor input (e.g., from a Light Detection And Ranging ("LIDAR") device), among other input sources. For example, the plurality of input sources may capture input and/or associate captured input at similar points in time, location, etc., such that the input may be analyzed concurrently. In a specific example, a testing device, such as a vehicle, may be equipped with a camera and a LIDAR device, and may capture images and point clouds as the vehicle moves along a route. The images and point clouds may be analyzed concurrently to generate 3D semantic scenes and/or autonomous vehicle motion trajectory/odometry. Additionally, for example, the images may be analyzed to group pixels together to thereby form superpixel clusters. Further, upon projecting the point cloud onto the generated image, the point cloud/superpixel cluster combined image may be further analyzed to remove points determined to be noise/errors within the point cloud.

The following includes definitions of selected terms employed herein. The definitions include various examples and/or forms of components that fall within the scope of a term and that may be used for implementation. The examples are not intended to be limiting.

The term "bus," as used herein, may refer to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

The term "memory," as used herein, may include volatile memory and/or nonvolatile memory. Non-volatile memory may include, for example, read only memory (ROM), programmable read only memory (PROM), erasable PROM (EPROM), and electrically erasable PROM (EEPROM). Volatile memory may include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, may include a connection by which entities are "operably connected", is one in which signals, physical communications, and/or logical communications may be sent and/or received. An operable connection may include a physical interface, a data interface and/or an electrical interface.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor, for example, may include microprocessors, microcontrollers, digital signal processors ("DSPs"), field programmable gate arrays ("FPGAs"), programmable logic devices ("PLDs"), state machines, gated logic, discrete hardware circuits, system-on-a-chip ("SoC"), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may have RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

FIG. 1 shows a schematic view of an example of a system 100 for localization, mapping and filtering for an autonomous vehicle in accordance with aspects described herein. Components of the system 100, as well as the components of other systems, hardware architectures and software architectures discussed herein, may be combined, omitted or organized into different architectures for various aspects of the disclosure. However, the example aspects and configurations discussed herein focus on the system 100 as illustrated in FIG. 1, with corresponding system components and related methods.

As shown in FIG. 1, system 100 may include or be operably coupled with (or executed by) one or more processors 102 and one or more memories 104 that communicate to effectuate certain actions described herein. For example, the one or more processors 102 and/or one or more memories 104 may execute, and/or store instructions, parameters, etc., for executing, a localization, mapping and filtering component 106 for generating localization, mapping and filtering information such as a three-dimensional ("3D") semantic scene and autonomous vehicle motion trajectory/odometry, an image component 108 for receiving one or more images (e.g., from a camera 110), a point cloud component 112 for receiving one or more point clouds (e.g., from a LIDAR 114 device), and/or a location component 116 for receiving one or more parameters related to a location of system 100 (e.g., and/or corresponding to the image and/or point cloud inputs). The processor(s) 102, memory(ies) 104, various ones of the components 106, 108, 112, 116, etc., may be operatively coupled via a bus 118. In another example, processor(s) 102 may execute one or more of the various components 106, 108, 112, 116 to perform functions described herein, while being operatively coupled to the memory(ies) 104 and/or other components via the bus 118.

In an example, the localization, mapping and filtering component 106 may include a 2D-3D detection component 120 for detecting objects in a point cloud based on image input and point cloud input, a point filter 122 for removing LIDAR points representing noise in a point cloud, and/or a SLAM component 124 for performing a SLAM operation on the point cloud.

In an aspect, the system 100 may be included, in whole or in part, within a vehicle traveling a route. In another example, the system 100 may be distributed between a vehicle and one or more remote devices (e.g., the camera 110 or the LIDAR 114 may be present on the vehicle, while one or more components, such as the localization, mapping and filtering component 106, may be distributed on one or more remotely located computers). In this regard, for example, processing of input from the camera 110, LIDAR 114, etc., may occur in the vehicle or at a remotely located device for performing localization and mapping. In an aspect, in either case, the localization, mapping and filtering component 106 may provide localization, mapping and filtering information, such as a 3D semantic scene, and/or the autonomous vehicle motion trajectory/odometry, to one or more other devices via a network 140 for displaying and/or further processing.

Figure 2:
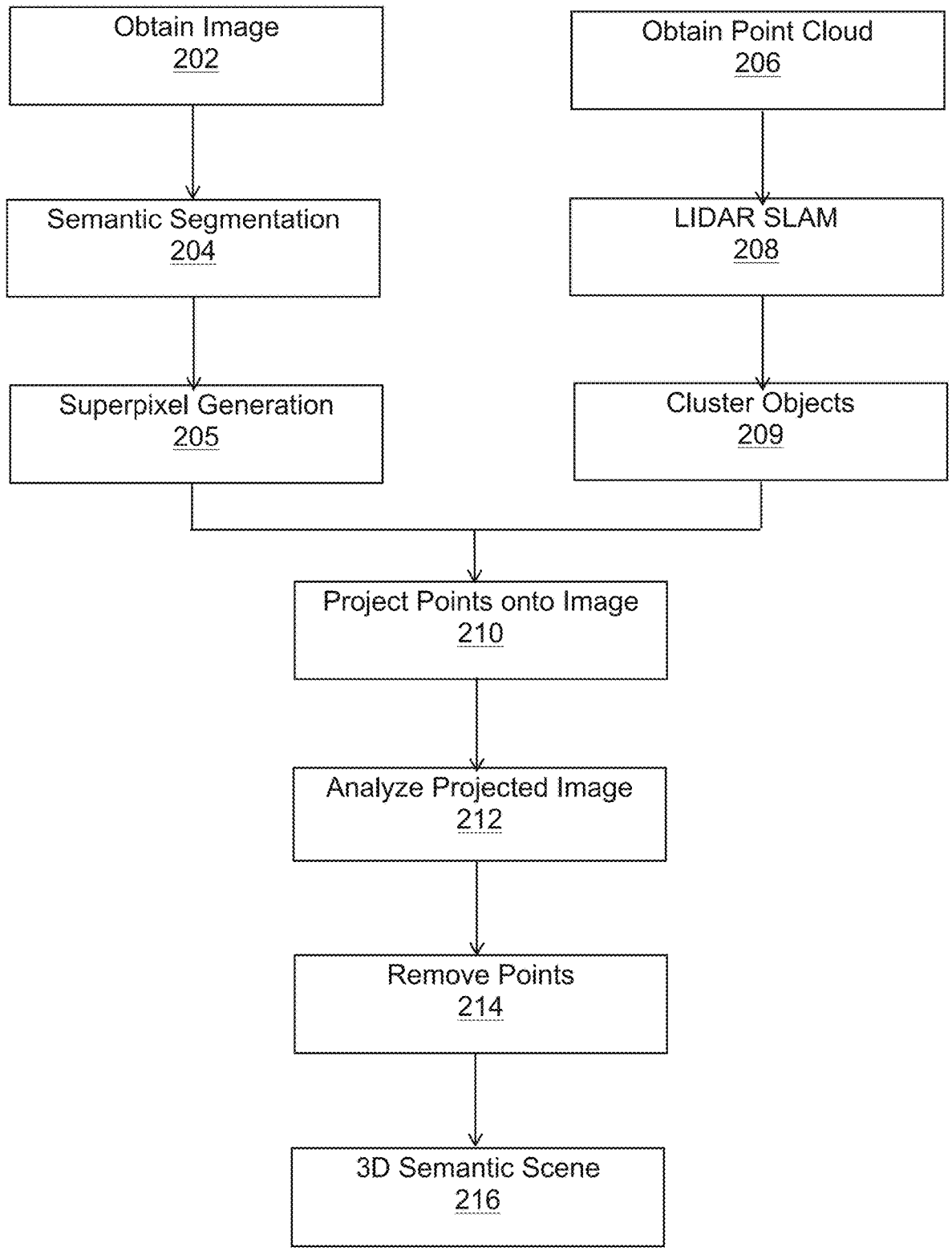
FIG. 2 illustrates a flowchart showing an example method for localization, mapping and filtering in accordance with aspects of the present disclosure.

Referring now to FIG. 2, which is described in conjunction with the example system 100 of FIG. 1, an example method 200 for localization, mapping and filtering is illustrated. In an aspect, the method 200 may be performed by the one or more processors 102 and/or the memories 104 of the system 100, which may be located in a vehicle or distributed at various locations, as described above. In this regard, one or more blocks may be performed (e.g., in whole or in part) in a vehicle or at a remote location, for generating localization and mapping information.

At block 202, the method may include obtaining an image. In an aspect, image component 108 may obtain, via a camera (e.g., camera 110), the image. For example, camera 110 may be positioned on a vehicle traveling along a route, and may be configured to periodically capture images and/or to capture video at a certain number of frames per second ("FPS"). The camera 110 may store the images/video locally and/or in memory(ies) 104, and/or may provide the images/video to a remote device, from which the image component 108 may receive the image. In addition, for example, the location component 116 may determine a location associated with the image, which may include obtaining global positioning system ("GPS") coordinates of a vehicle that includes the camera 110 at or near the time at which the image is captured by the camera 110. In an aspect, the location component 116 may associate the GPS coordinates with the image (e.g., in image metadata or otherwise in relational storage) such that the location may be determined for the image when processing the image.

In block 204, the method 200 may include performing semantic segmentation on the image. In an aspect, the localization, mapping and filtering component 106 may perform the semantic segmentation on the 2D image. For example, the 2D-3D detection component 120 may perform semantic segmentation on the image by applying a dilated convolutional semantic segmentation neural network to the image to associate at least a portion of the pixels with one or more semantic predictions. In an aspect, the 2D-3D detection component 120 may apply the dilated convolutional semantic segmentation neural network. In another aspect, the 2D-3D detection component 120 may use a deep learning algorithm and overlay segmentation results on the original image. In another aspect, a Resnet-101 model may be applied for feature extraction and for initialize weight from a pre-trained ImageNet model. Further, the Resnet-101 model may be modified to adopt a Feature Pyramid Network ("FPN") model. Object recognition may be more accurate in the image domain (e.g., as opposed to the point cloud domain) based on a more accurate pictorial representation of the scene. Accordingly, the 2D-3D detection component 120 may apply the dilated convolution semantic segmentation neural network to the image to output a dense pixel-wise semantic categories prediction. For example, the output from applying the semantic segmentation may appear to have similar shapes and outlines to the image where color values for the pixels are replaced with color values that correspond to a detected object based on object definitions in the semantic segmentation. Thus, for example, a semantic category corresponding to a group of pixels may be determined based on the pixel color value, and certain sizing parameters of the object may be determined or inferred based on a number of neighboring pixels corresponding to the pixel color value in a given direction. The semantic segmentation may result in an image having pixels that are labeled according to the semantic categories.

In an aspect, the semantic categories may include road, sky, sidewalk, plant, person, vehicle, and building, among other categories. In an example, the 2D-3D detection component 120 may determine the semantic categories, which may not be accurate on a boundary of the object in the image, due in part to uncertainty as to whether the edge pixels are part of the object due to inaccuracies of the information in the semantic segmentation. Moreover, for example, applying the semantic segmentation may result in semantic categorization that is not instance specific (e.g., multiple objects having the same semantic category may be associated with the same pixel values).

In block 205, the method 200 may include using the pixel color, as determined in step 204, to group image pixels together thereby generating superpixel clusters. In an aspect, the point filter 122 may implement a Simple Linear Iterative Clustering ("SLIC") algorithm to cluster pixels in a combined five-dimensional color and image plane space to efficiently generate compact, nearly uniform superpixels. In another aspect, a Quickshift SLIC algorithm may also be implemented whereby superpixels are generated by computing a hierarchical segmentation on multiple scales simultaneously.

At block 206, the method 200 may include obtaining a point cloud. In an aspect, the point cloud component 112 may obtain, via the light detector (e.g., the LIDAR 114), the point cloud. For example, the LIDAR 114 may be positioned on a vehicle traveling along a route, and may be configured to periodically capture point cloud scans of an area along the route. The LIDAR 114 may store the point clouds locally and/or in the memory(ies) 104, and/or may provide the point clouds to a remote device, from which the point cloud component 112 may receive the point clouds. In addition, for example, the location component 116 may determine a location associated with the point clouds, which may include obtaining global positioning system ("GPS") coordinates of a vehicle that includes the LIDAR 114 at or near the time at which at least a portion of the point cloud is captured by the LIDAR 114. In an example, the location component 116 may associate the GPS coordinates with the point clouds (e.g., in point cloud metadata or otherwise in relational or other storage), such that the location may be determined for the point cloud when processing the point cloud for localization and mapping.

In one aspect, the location component 116 may associate the images and point clouds captured at a similar point in time with one another and/or with the corresponding location. In addition, as described further herein, the localization, mapping and filtering component 106 may obtain the image and point cloud inputs, which may be synchronized based on an associated point in time at which capturing of the image and point cloud occurred, and based on the associated location, among other factors.

At block 208, the method 200 may include performing a simultaneous localization and mapping ("SLAM") operation. In an aspect, the SLAM component 124 may receive the point cloud and perform the SLAM operation on the point cloud. In an example, prior to the SLAM component 124 receiving the point cloud, the 2D-3D detection component 120 may remove dynamic objects such as cars, pedestrians and cyclists from the point cloud. The SLAM component 124 may perform the SLAM operation using one or more SLAM algorithms such as Normal Distributive Transform ("NDT"), Iterative Closest Point ("ICP"), Probabilistic Iterative Correspondence ("pIC"), Conditional Random Fields ("CRF"), Local Geometric Features registration, and Branch and Bound, among other SLAM algorithms. The method 200 may output localization and mapping based on the SLAM algorithm performed. In an aspect the SLAM component 124 may output a 3D point cloud map data and/or autonomous vehicle motion trajectory/odometry data based on the SLAM algorithm.

At block 209, the method 200 may include determining a plurality of object clusters within the point cloud. For example, the 2D-3D detection component 120 may determine the object clusters by organizing the point cloud into smaller portions and categorizing different portions of the point cloud. In an aspect, the 2D-3D detection component 120 may perform clustering by using, for example, a Frustum-Based PointNet method on the 3D point cloud.

At block 210, the method 200 may include projecting the point cloud onto the image containing the generated superpixels. For example, LIDAR points from block 208 may be projected onto the image generated at block 205 containing the previously determined superpixels. In an aspect, the generated image may have the semantic segmentation map overlaid on the original 2D image with the superpixel clusters, and projected with the point cloud.

At block 212, the method 200 may include analyzing the generated image, e.g., the 2D superpixel image protected with the 3D LIDAR points. In one aspect, the point filter 122 may obtain a list of all the projected points falling within each generated superpixel. For example, within each superpixel a plurality of points may be projected, as illustrated in FIG. 5A described below, and a list may be generated having the plurality of points.

At block 214, the method 200 may including removing additional points that are determined to be noise/errors based on the generated point list. In one aspect, to determine the noise/error points, the point filter 122 may implement a statistical outlier removal algorithm for removing points considered to be noise/errors within each superpixel. In one aspect, for each point within a superpixel, a mean distance from each of the point's neighbors may be calculated. Further, by assuming that the resulted distribution is Gaussian, points whose mean distances are outside an interval defined by the global distances mean and standard deviations, may be considered as outliers. Thus, the points determined to be outliers may be removed. In another aspect, a Random Sample Consensus ("RANSAC") fitting may be implemented to remove points considered to be noise/errors within each superpixel. RANSAC is an iterative method to estimate parameters of a mathematical model from a set of observed data that contains outliers, when outliers are to be accorded no influence on the values of the estimates. For example, by fitting a spherical model using each group of points using a random consensus sampling, outliers that do not fit the model may be removed as noise.

At block 216, the method 200 may include associating object candidates to conduct tracking and thereby generate a 3D semantic map. In an aspect, the 2D-3D detection component 120 may receive the image after semantic segmentation has been performed, the point cloud after LIDAR SLAM has been conducted, and the filtered point cloud after the noisy points having been clustered. Further, based on these received components, the 2D-3D detection component 120 may associate at least the portion of the points that correspond to at least the portion of the pixels with the associated one or more semantic predictions. Based on the association of the pixels to the points, the 2D-3D detection component 120 may transfer labels from the pixels of the image to associated points of the point cloud. The 2D-3D detection component may thereby perform semantic mapping and generate a 3D semantic scene.

In an example, the localization, mapping and filtering component 106 may provide the 3D semantic scene and/or the autonomous vehicle motion trajectory/odometry data to one or more other devices via network 140. For example, the localization, mapping and filtering component 106 may upload the 3D semantic scene and/or the autonomous vehicle motion trajectory/odometry data via network 140, and other vehicles, personal devices (e.g., cellular phones, tablets, etc.) may download the 3D semantic scene and/or the autonomous vehicle motion trajectory/odometry data for displaying on a display of a navigation system, for augmenting or updating the 3D semantic scene and/or autonomous vehicle motion trajectory/odometry data, etc. In one aspect, a plurality of 3D semantic scenes can be stitched together in a continuous fashion and can be considered 3D semantic mappings.

Figure 3:
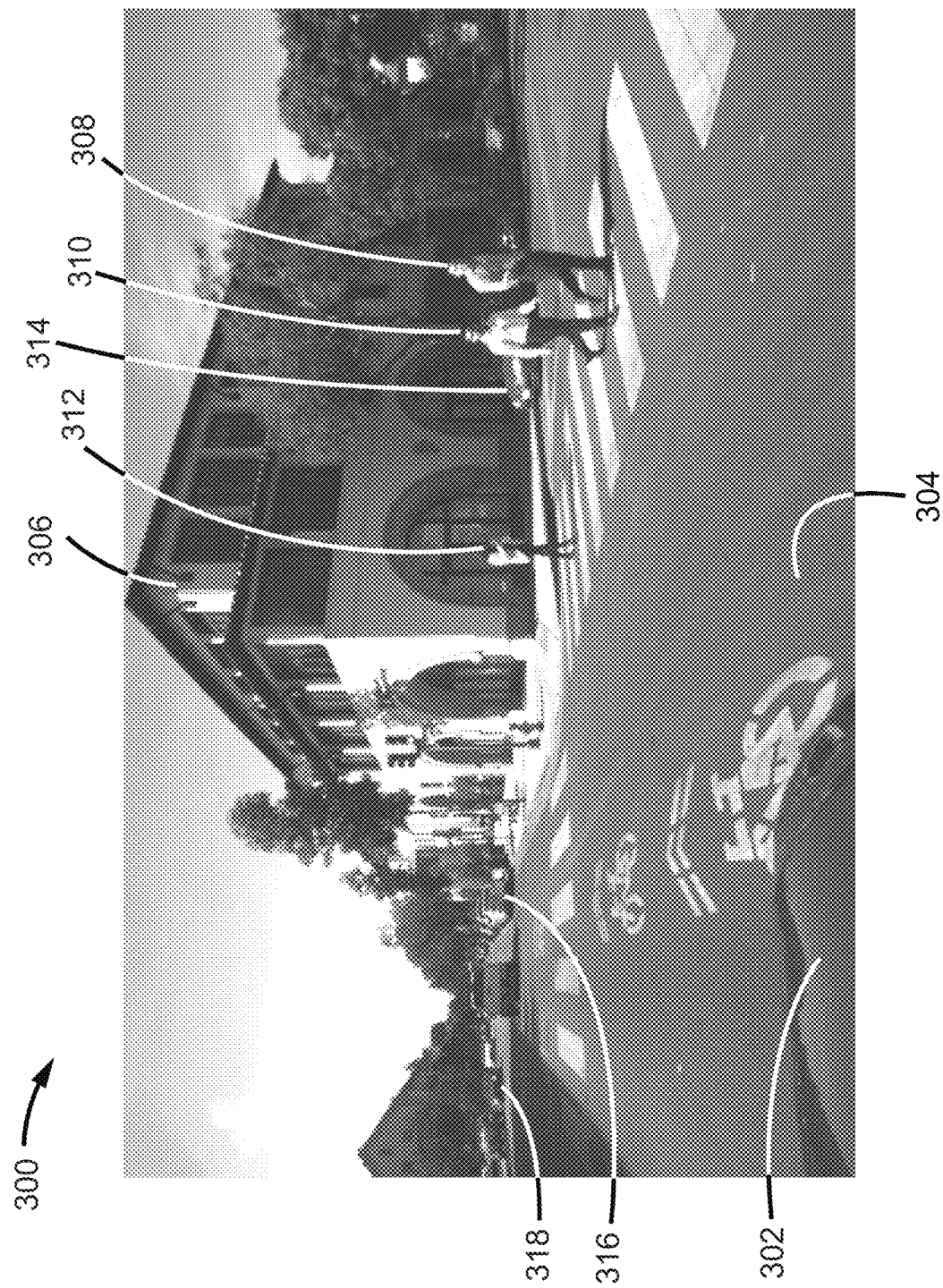
FIG. 3 illustrates an example of an image captured for localization, mapping and filtering according to one aspect of the present disclosure.

FIGS. 3-6A and B illustrate examples of images and/or scans in accordance with aspects described above. FIG. 3 illustrates an example of an image 300 captured by a camera 110, where the camera 110 may be mounted on a vehicle 302 traveling a route. The image 300 depicts a scene captured by the camera 110 along the route, and the scene may be associated with a location (e.g., a location of vehicle 302 when the image 300 is captured), as described above. The image 300 includes a street 304, various buildings 306 along the street 304, a plurality of people 308, 310, 312 walking on or nearby the street 304, and a plurality of vehicles 314, 316, 318 parked and/or traveling along the street 304. This image 300 may be an example of an image provided to the localization, mapping and filtering component 106.

Figure 4:
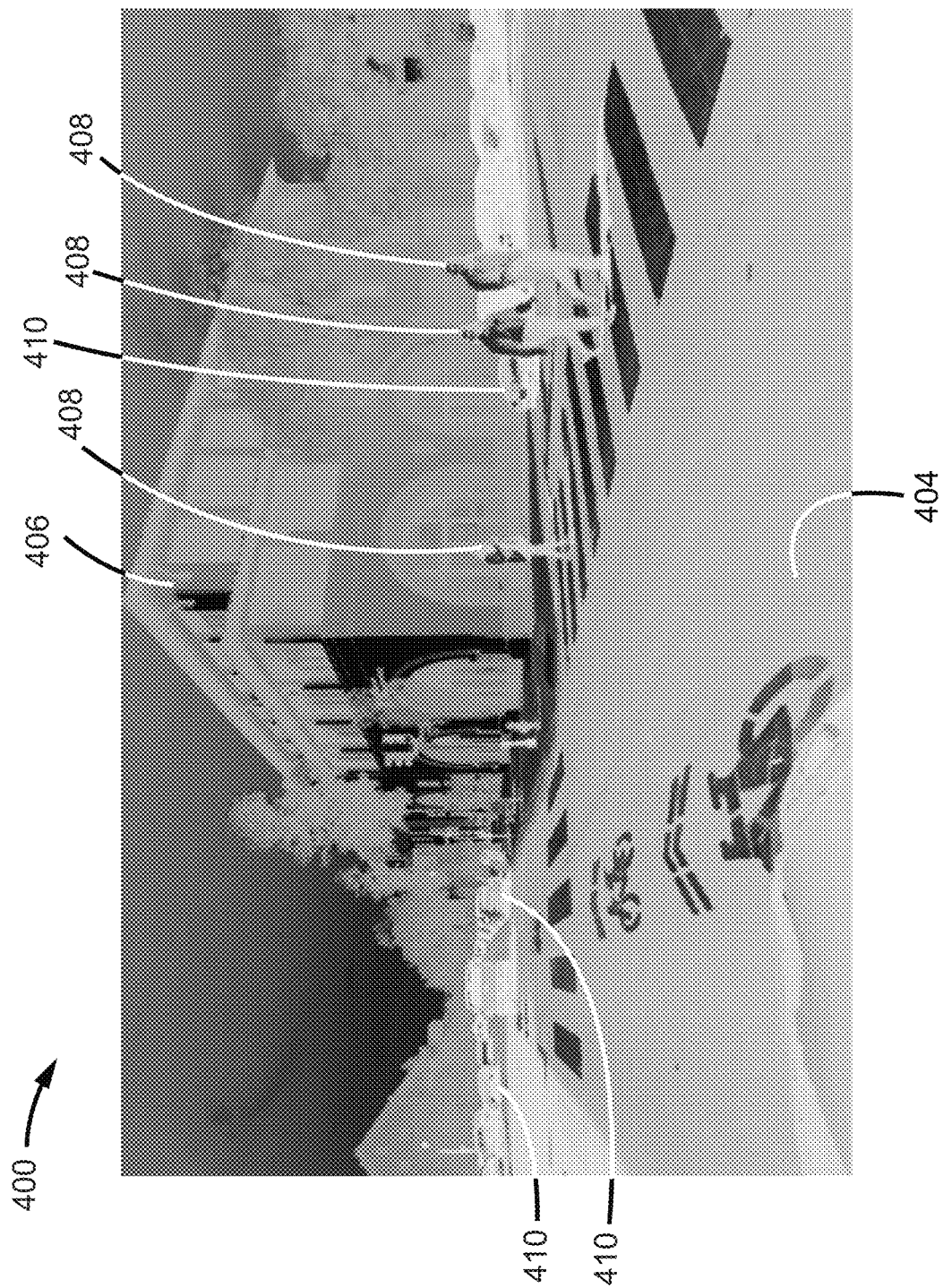
FIG. 4 illustrates an example of a semantic segmentation predicted image created from the image of FIG. 3 according to one aspect of the disclosure.

FIG. 4 illustrates an example of a semantic segmentation predicted image 400 generated from the image 300. For example, the 2D-3D detection component 120 may detect the street 304 in the image 300, and modify pixel values of pixels identified as the street 304 to be of one color, to yield street 404 in the semantic predicted image 400. Similarly, the 2D-3D detection component 120 may detect the buildings 306 in image 300, and modify pixel values of pixels identified as the buildings 306 to be of one color, to yield buildings 406 in the semantic predicted image 400. Further, the 2D-3D detection component 120 may detect the people 308, 310, 312 in image 300, and modify pixel values of pixels identified as the people 308, 310, 312 to be of one color, to yield people 408 in the semantic predicted image 400. Moreover, for example, the 2D-3D detection component 120 may detect the vehicles 314, 316, 318 in image 300, and modify pixel values of pixels identified as a vehicle to be of one color, to yield vehicles 410 in the semantic predicted image 400. As described, objects identified in the same semantic class (e.g., vehicle) may be modified to be of the same color and therefore include the same label.

FIG. 4A illustrates another semantic segmentation predicted image 400a in color. As described above in accordance with FIG. 4, vehicles 410 may be identified, and the pixel values modified accordingly. Similarly, the 2D-3D detection component 120 may detect the buildings 306 in image 300, and modify pixel values of pixels identified as the buildings 306 to be of one color, to yield buildings 406 in the semantic predicted image 400a. Similarly, the 2D-3D detection component 120 may detect the cross walk in image 300, and modify pixel values of pixels identified as the crosswalk to be of one color, to yield crosswalk 402 in the semantic predicted image 400a. As described above, objects identified in the same semantic class (e.g., vehicle, building, etc.) may be modified to be of the same color and therefore include the same label. Additionally, FIG. 4A illustrates the generated superpixels 450 as yellow boxes/lines. As described above in box 205 of FIG. 2, the superpixels are illustrated in FIG. 4A as the generated yellow outlines, interchangeably referred to herein as boxes, throughout the image. Further, the superpixels 450 are generated for the entire image.

Figure 5:
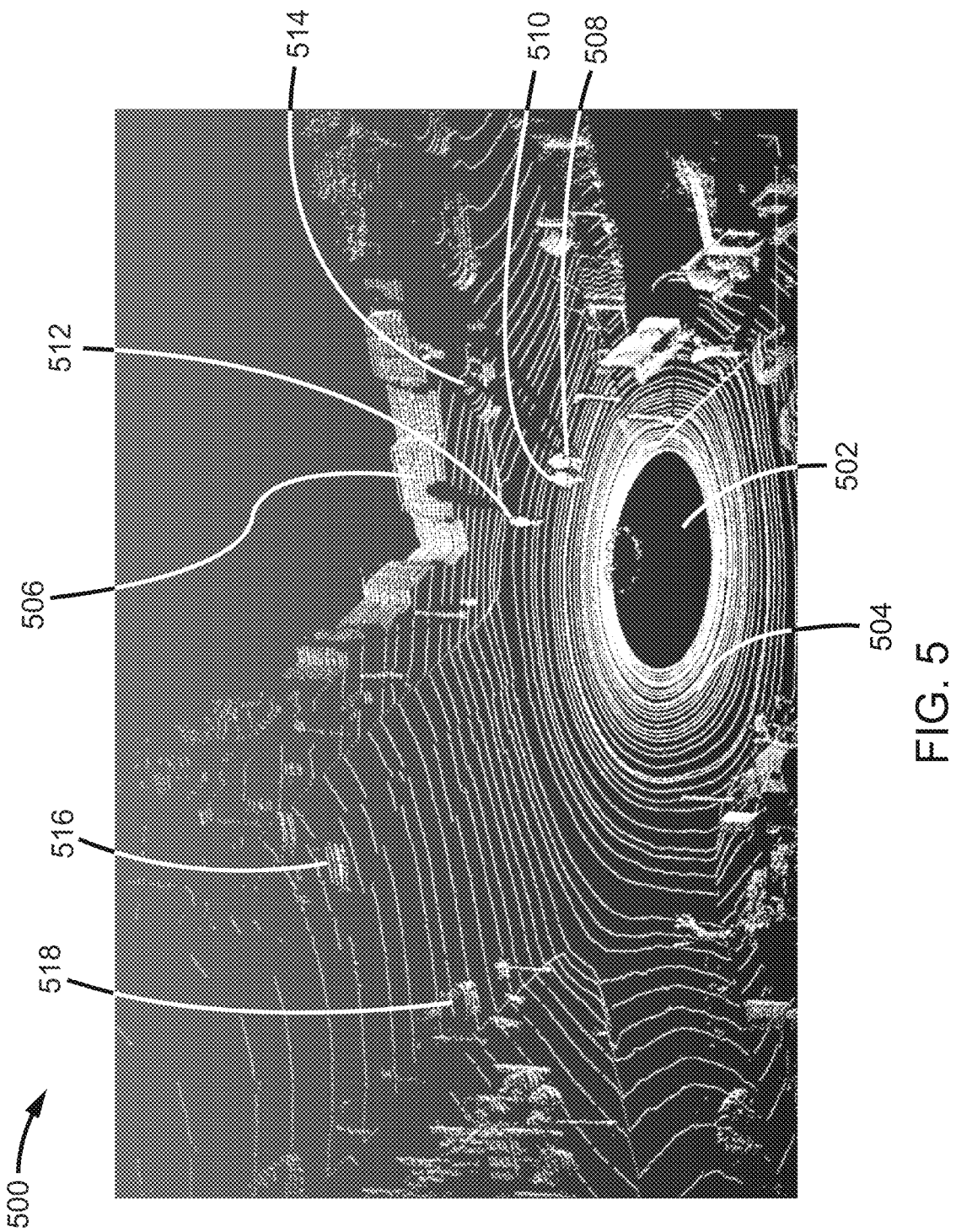
FIG. 5 illustrates an example of a point cloud captured for localization, mapping and filtering according to one aspect of the present disclosure.
Figure 5A:
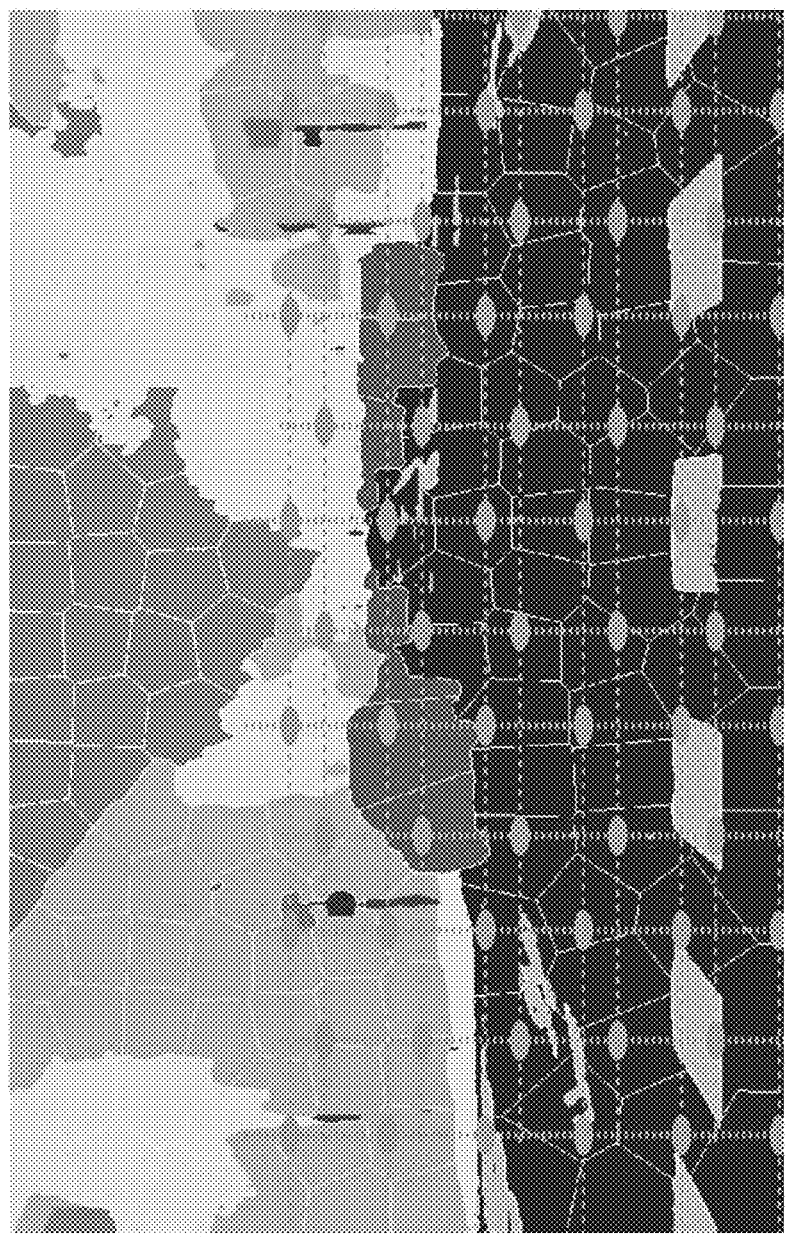
FIG. 5A illustrates example of a point cloud projected onto an image created from the image 4A according to one aspect of the disclosure.

FIG. 5 illustrates an example of a point cloud 500 obtained from LIDAR 114, which may also be mounted on the vehicle 502 traveling the route. The point cloud 500 depicts a LIDAR scan captured by the LIDAR 114 along the route, and may also be associated with the location of the image 300 based on a time at which the image 300 and point cloud 500 are captured, a location of the vehicle 502 when the point cloud 500 is captured, etc. The point cloud 500 includes a plurality of points that define a street 504 (which may be the street 304 in the image 300), one or more buildings 506 (which may be the building 306 in the image 300), a plurality of people 508, 510, 512 (which may be the plurality of people 308-312 in the image 300), and a plurality of vehicles 514, 516, 518 (which may be one or more of the vehicles 314-318 in the image 300). The point cloud 500 may be provided to the localization, mapping and filtering component 106.

FIG. 5A illustrates an example of a point cloud 500a obtained from LIDAR 114, and projected onto a semantic segmentation image obtained from a camera 112. In an aspect, the point cloud may be projected onto the image containing the generated superpixels. As described above in block 212 of FIG. 2, each superpixel may be analyzed as illustrated in 550. For purposes of explanation, the analysis is broken into three steps, 552, 554 and 556, respectively. For example, in step 552 the superpixel having a vehicle may be determined by the semantic segmentation of bock 204 of FIG. 2, as described above, and overlaid onto the original image captured by the camera 110. Further, in step 554 the point cloud captured by the LIDAR 114 may be projected onto the image, as described above in reference to block 210 of FIG. 2. Further, in step 556 the point cloud as projected onto the image may be analyzed, as described above in block 212 of FIG. 2. For example, in step 556, based on the analysis step in block 212 of FIG. 2 described above, the green point may be determined to be too far away compared to other points in the group. Thus, the green point is considered to be a noise/error point, and may thereby be filtered and removed.

Figure 6A:
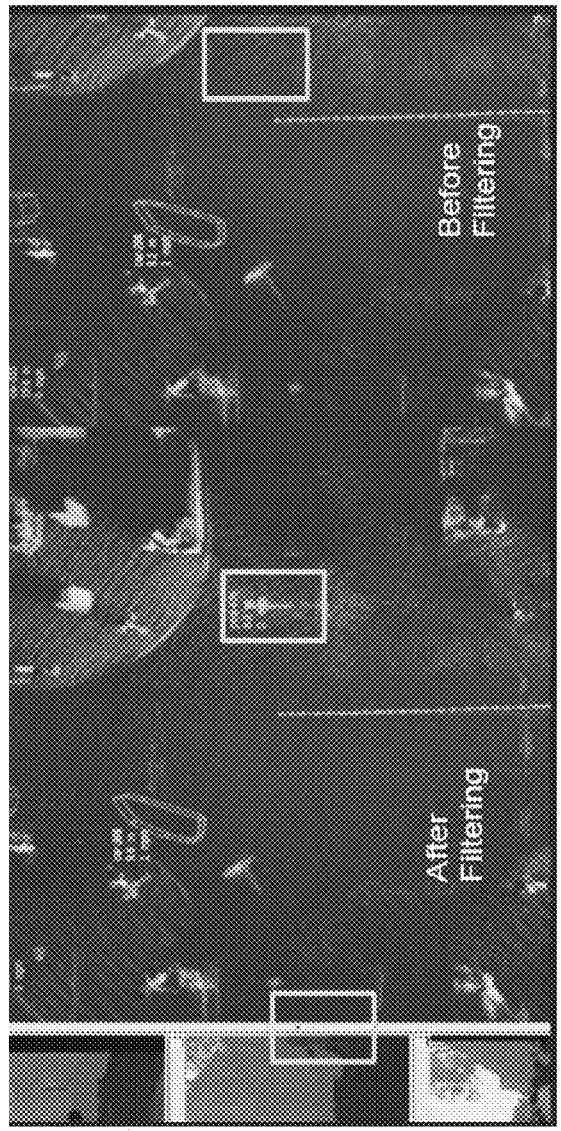
FIG. 6A illustrates an example of 3D semantic scene before and after filtering according to one aspect of the present disclosure.

FIG. 6A illustrates an example of a 3D semantic scene before and after filtering. For example, prior to filtering and removing the points determined to be noise/errors, a human was not recognized. After filtering, the human is clearly determined and represented on the 3D semantic scene.

In an aspect, FIG. 6A illustrates traffic participate detection, and may be implemented by the 2D-3D detection component 120 of FIG. 1. Traffic participate detection may recognize specific features of a three-dimensional point cloud. For example, as illustrated in FIG. 6A, vehicles are recognized and labeled with green boxes. The velocity, direction and location of the vehicles may also be detected.

Figure 6B:
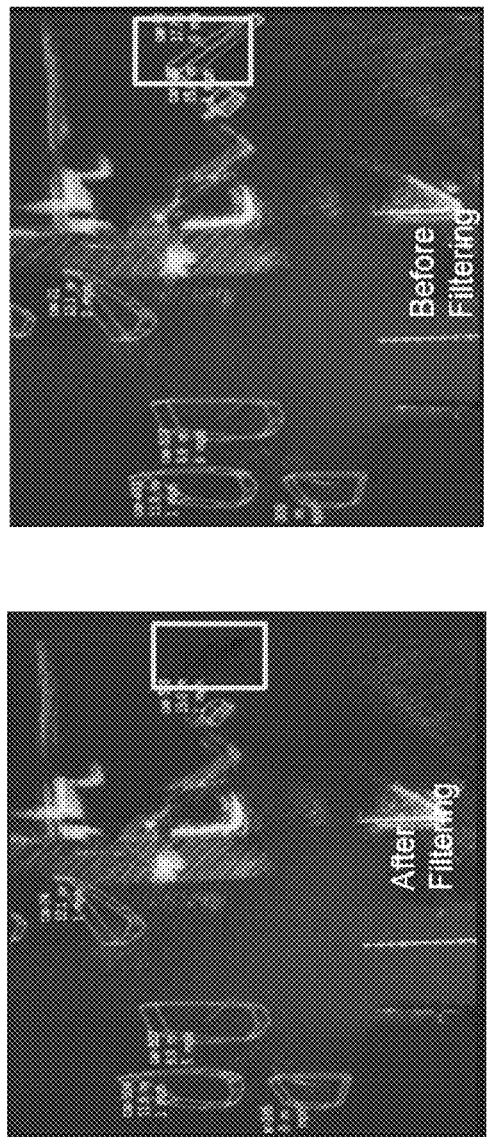
FIG. 6B illustrates an illustrates an example of 3D semantic scene before and after filtering according to one aspect of the present disclosure.

FIG. 6B illustrates an example of a 3D semantic scene before and after filtering. For example, prior to filtering and removing the points determined to be noise/errors, a wall was recognized as a moving vehicle. Additionally, after filtering, the wall is clearly determined and represented on the 3D semantic scene as a wall.

In an aspect, FIG. 6B illustrates another example of traffic participate detection, and may be implemented by the 2D-3D detection component 120 of FIG. 1. Traffic participate detection may recognize specific features of a three-dimensional point cloud. For example, as illustrated in FIG. 6B, vehicles are recognized and labeled with green boxes. The velocity, direction and location of the vehicles may also be detected. Additionally, as discussed above, a wall may be erroneously detected and supplied with a green box prior to filtering.

Figure 7:
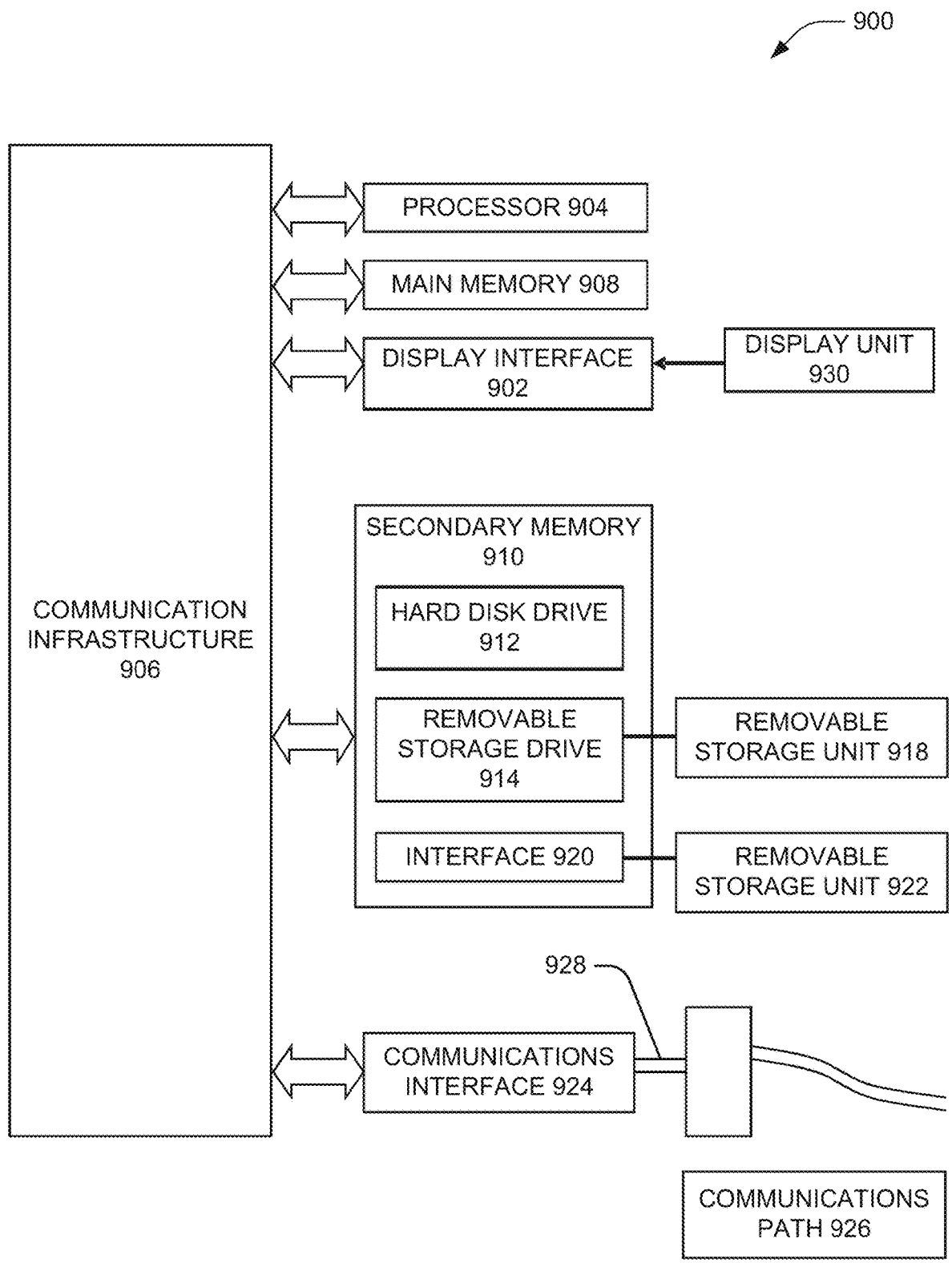
FIG. 7 illustrates an example system diagram of various hardware components and other features for use in accordance with aspects of the present disclosure.

Aspects of the present disclosure may be implemented using hardware, software, or a combination thereof and may be implemented in one or more computer systems or other processing systems. In one variation, aspects of the disclosure are directed toward one or more computer systems capable of carrying out the functionality described herein. An example of such a computer system 900 is shown in FIG. 7.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the disclosure are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present disclosure, as discussed herein. In particular, the computer programs, when executed, enable the processor 904 to perform such features. Accordingly, such computer programs represent controllers of the computer system 900. Computer programs may include localization, mapping and filtering component 106, image component 108 for receiving images from one or more cameras 110, point cloud component 112 for receiving point clouds, location component 116 for determining location of one or more entities associated with the processor 904, etc., as described herein.

In variations where aspects of the disclosure are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the disclosure are implemented using a combination of both hardware and software.

Figure 8:
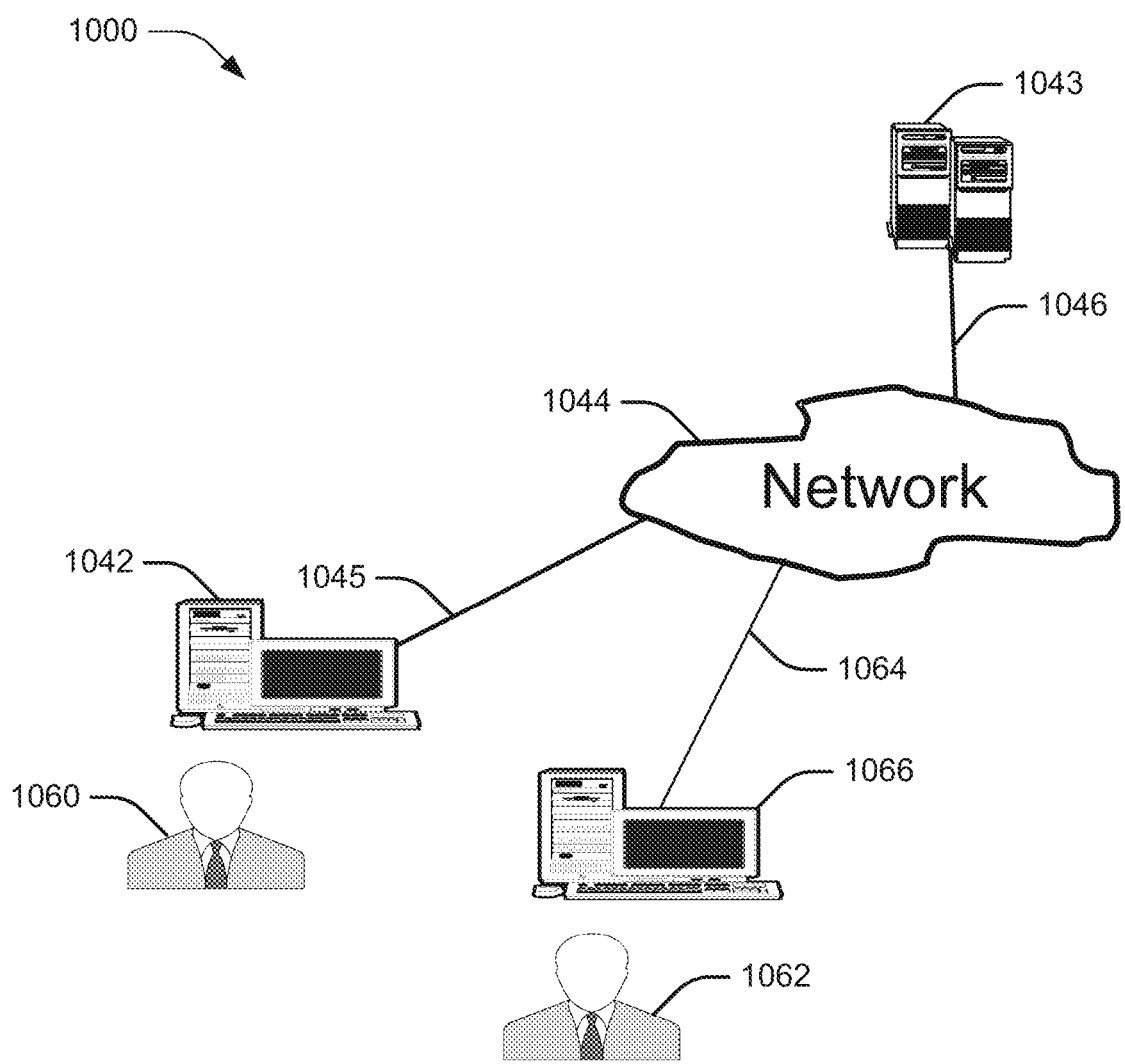
FIG. 8 is a block diagram of various example system components for use in accordance with aspects of the present disclosure.

FIG. 8 is a block diagram of various example system components that may be used in accordance with aspects of the present disclosure. For example, the various components may be within the vehicle 102, or only some of the components may be within the vehicle 102, and other components may be remote from the vehicle 102. The system 1000 includes one or more accessors 1060, 1062 (also referred to interchangeably herein as one or more "users") and one or more terminals 1042, 1066 (such terminals may be or include, for example, various features of the object detection system 110). In one aspect, data for use in accordance with aspects of the present disclosure is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for improving semantic mapping and traffic participant detection for an autonomous vehicle, comprising:
    obtaining, via a camera, a two-dimensional image;
    obtaining, via a light detector, a three-dimensional point cloud comprising a plurality of points;
    performing semantic segmentation on the image to map objects with a discrete pixel color, and overlaying the semantic segmentation on the image to generate a semantic segmentation image;
    generating superpixel clusters from the semantic segmentation image to group like pixels together;
    projecting the point cloud onto the semantic segmentation image comprising the superpixel clusters; and
    removing points determined to be noise/errors from the point cloud based on determining noisy points within each superpixel cluster.

2. The method of claim 1, wherein the superpixels are generated based on implementing an algorithm of simple linear iterative clustering ("SLIC") superpixels or Quickshift SLIC.

3. The method of claim 1, further comprising obtaining a list of all points within each superpixel cluster.

4. The method of claim 3, wherein the noisy points are determined from the list of all points within each superpixel cluster based on a statistical outlier removal method.

5. The method of claim 4, wherein the statistical outlier removal method is sparse outlier removal method or a random sample consensus ("RANSAC") fitting model.

6. The method of claim 1, further comprising after removal of the noisy points, generating a three-dimensional semantic scene.

7. The method of claim 1, further comprising performing a simultaneous localization and mapping operation ("SLAM") on the point cloud before projecting the point cloud.

8. A system comprising:
    a camera for obtaining a two-dimensional image;
    a light detector for obtaining a three-dimensional point cloud comprising a plurality of points;
    a memory;
    a processor coupled to the memory and configured to:
    perform semantic segmentation on the image to map objects with a discrete pixel color, and overlaying the semantic segmentation on the image to generate a semantic segmentation image;
    generate superpixel clusters from the semantic segmentation image to group like pixels together;
    project the point cloud onto the semantic segmentation image comprising the superpixel clusters; and
    remove points determined to be noise/errors from the point cloud based on determining noisy points within each superpixel cluster.

9. The system of claim 8, wherein the superpixels are generated based on implementing an algorithm of simple linear iterative clustering ("SLIC") superpixels or Quickshift SLIC.

10. The system of claim 8, wherein the processor is further configured to obtain a list of all points within each superpixel cluster.

11. The system of claim 10, wherein the noisy points are determined from the list of all points within each superpixel cluster based on a statistical outlier removal method.

12. The system of claim 11, wherein the statistical outlier removal method is sparse outlier removal method or a random sample consensus ("RANSAC") fitting model.

13. The system of claim 8, wherein the processor is further configured to after removal of the noisy points, generate a three-dimensional semantic scene.

14. The system of claim 8, wherein the processor is further configured to perform a simultaneous localization and mapping operation ("SLAM") on the point cloud before projecting the point cloud.

15. A non-transitory computer-readable storage medium containing executable computer program code, the code comprising instructions configured to cause a processor to:
    obtain a two-dimensional image;
    obtain a three-dimensional point cloud comprising a plurality of points;
    perform semantic segmentation on the image to map objects with a discrete pixel color, and overlaying the semantic segmentation on the image to generate a semantic segmentation image;
    generate superpixel clusters from the semantic segmentation image to group like pixels together;
    project the point cloud onto the semantic segmentation image comprising the superpixel clusters; and
    remove points determined to be noise/errors from the point cloud based on determining noisy points within each superpixel cluster.

16. The non-transitory computer-readable storage medium of claim 15, wherein the superpixels are generated based on implementing an algorithm of simple linear iterative clustering ("SLIC") superpixels or Quickshift SLIC.

17. The non-transitory computer-readable storage medium of claim 15, further configured to obtain a list of all points within each superpixel cluster.

18. The non-transitory computer-readable storage medium of claim 17, wherein the noisy points are determined from the list of all points within each superpixel cluster based on a statistical outlier removal method.

19. The non-transitory computer-readable storage medium of claim 18, wherein the statistical outlier removal method is sparse outlier removal method or a random sample consensus ("RANSAC") fitting model.

20. The non-transitory computer-readable storage medium of claim 15, further configured to after removal of the noisy points, generate a three-dimensional semantic scene.

* * * * *